Feb. 21, 1956  L. C. ATWOOD ET AL  2,735,694
BICYCLE KICK STAND MOUNTING BRACKET
Original Filed Nov. 22, 1950
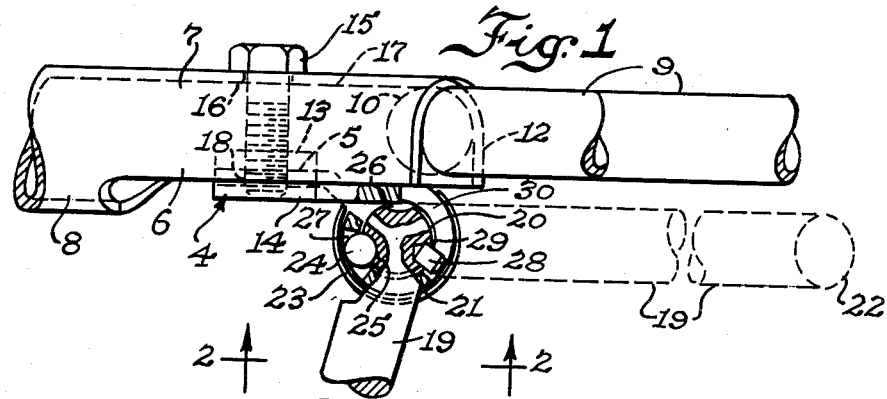
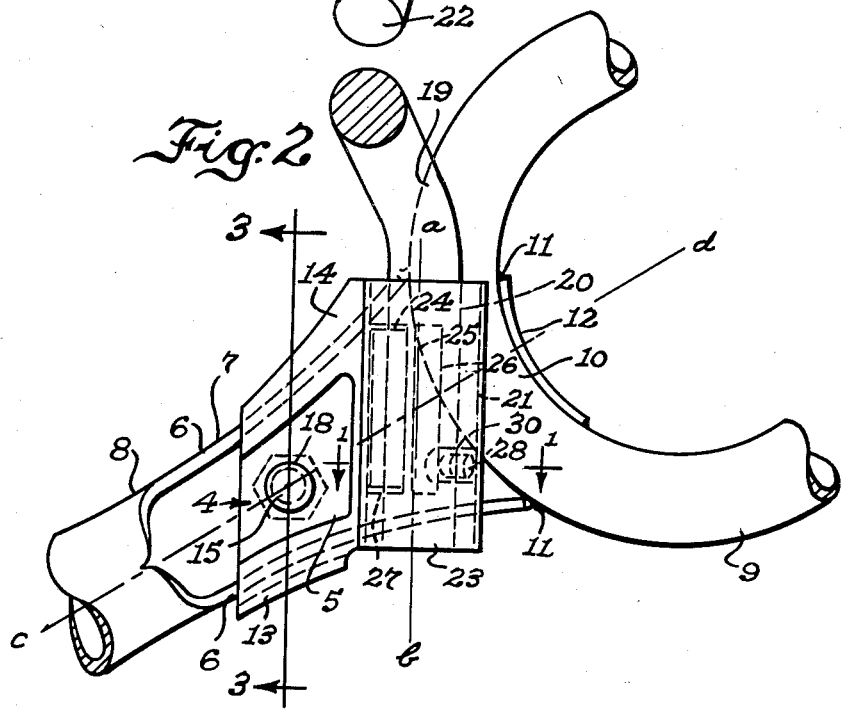
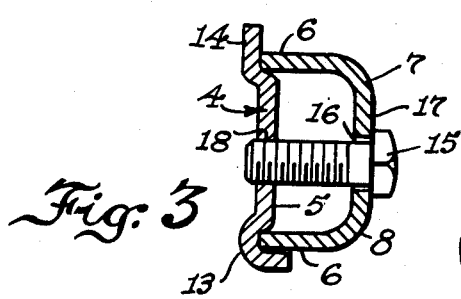
Inventors.
LYLE C. ATWOOD
AGNAR JOHNSON

United States Patent Office 2,735,694
Patented Feb. 21, 1956

2,735,694
BICYCLE KICK STAND MOUNTING BRACKET

Lyle C. Atwood and Agnar Johnson, Rockford, Ill., assignors to Atwood Vacuum Machine Company, Rockford, Ill., a corporation of Illinois Original application November 22, 1950, Serial No. 197,022, now Patent No. 2,685,452, dated August 3, 1954. Divided and this application April 7, 1952, Serial No. 281,004

4 Claims. (Cl. 280—301)

This application is a division of our copending application, Serial No. 197,022, filed November 22, 1950, now Patent No. 2,685,452.

This invention relates to a new and improved mounting bracket for bicycle kick stands.

The principal object is to provide a mounting bracket in the form of an attaching plate of simplified and improved construction especially designed and adapted for application to bicycles having a welded frame construction wherein the U-shaped tubular rear fork is welded by its cross-portion in a cross-head formed on the rear end of a channel shaped frame member, the spaced side walls of which project downwardly and are disposed in rearwardly diverging relationship, the attaching plate being suitably shaped to conform to and fit on the lower edge portions of these walls and be fastened firmly in place and without freedom to turn, by means of a single centrally located bolt passing through registering holes provided in the plate and in the web forming the top wall of the channel.

The invention is illustrated in the accompanying drawing, in which—

Fig. 1 is a side view of a kick stand the mounting bracket for which is made in accordance with our invention, the same being shown applied to a bicycle frame, a portion of the supporting leg being broken off to save space and permit showing the device as a whole on a larger scale, and portions of the bearing and journal entered therein being shown in section on line 1—1 of Fig. 2 to better illustrate the construction and indicate the mode of operation;

Fig. 2 is a bottom view taken on line 2—2 of Fig. 1, and

Fig. 3 is a cross-section on line 3—3 of Fig. 2.

The same reference numerals are applied to corresponding parts in these three views.

Referring to the drawing, the reference numeral 4 designates generally the mounting bracket of our invention, which comprises a stamped sheet metal attaching plate, the same having a dovetail-shaped embossed central portion 5 which fits neatly and without freedom to turn between the rearwardly diverging walls 6 of the channel shaped rear portion 7 of the bicycle frame member 8. The latter extends rearwardly from the usual hanger bearing on the lower central portion of the bicycle frame and is connected to the horizontal rear fork 9. The front cross-portion 10 of this fork is welded, as indicated at 11, in the cross-head portion 12 formed on the rear widened end of the channel shaped portion 7 of frame member 8. To further insure rigid attachment of the plate 4 on this frame, a longitudinally curved channel 13 is formed on one marginal edge portion of the plate in which the curved edge of one side wall 6 is received. The other edge portion 14 of the plate is left flat for abutment with the edge of the other side wall 6. With this plate 4 so formed, a single fastening bolt 15 is sufficient to anchor the plate firmly to the frame. This bolt is passed freely through a hole 16 in the web portion 17 of channel 7 and threaded in a hole 18 provided in the center of the embossed portion 5 of the plate. The head of this bolt is, therefore, conveniently located for tightening with a wrench, and only the one tool is needed in the application of the kick stand to the bicycle.

The rest of the kick stand illustrated forms the subject matter of the parent application. The supporting leg 19 for propping the bicycle is made from cylindrical rod material bent to the required generally L-shape, providing a journal 20 on the inwardly directed transversely extending pivotal end portion for oscillation in the bearing 21 formed by the cylindrical curled end of the plate 4. This bearing 21 has its axis $a$—$b$ in acute angle relationship to the center line $c$—$d$ of the plate 4 and frame member 8, as appears in Fig. 2, so as to locate the outwardly directed transversely extending ground engaging end portion 22 of leg 19 far enough away from the bicycle for good support when the leg is turned through nearly 120° from a nearly horizontal retracted position indicated in dotted lines in Fig. 1, wherein it is nearly parallel to and alongside the bicycle rear fork 9, in the usual way, to the operative position shown in full lines in Fig. 1. The bearing 21 is of ample length and the journal 20 extends the full length thereof so that the unit bearing pressure in this construction is reduced far below what has been common for devices of this kind in the past. The bearing 20 is rather tightly enclosed by a split sleeve spring 23 substantially its full length, and this spring, sometimes referred to as a C-spring, because of its C-shaped cross-section, serves to press a cylindrical detent pin 24 into whichever one of two rounded grooves 25 and 26 in the journal 20 is brought into register with the slot 27 in the bearing 21, the pin 24 being caged in said slot and having an easy working fit therein. The pin 24 causes the spring 23 to be spread to an appreciable extent when the pin is seated in either of the grooves 25 and 26, as appears in Fig. 1, but when the leg 19 is turned to turn the journal 21 and accordingly force the pin 24 to ride out of the groove the spring is spread much more, as must be clear from a study of Fig. 1, and hence the spring is loaded enough so that it will snap the pin back into the other groove under heavier spring pressure as soon as that groove comes into register with the slot. The slot 27 terminates short of the ends of the bearing 20, as appears in Fig. 2, and the pin 24 is slightly shorter than the slot so that it will work freely therein. The grooves 25 and 26 are circumferentially spaced about 120°, more or less, and are so related to the leg 19 so that when pin 24 is seated in groove 26 the leg is supported releasably in the raised, substantially horizontal retracted position indicated in dotted lines in Fig. 1, and when pin 24 is seated in groove 25 the leg is supported in the lowered operative position shown in full lines in Fig. 1. The groove 25 should be and preferably is a trifle deeper than groove 26 inasmuch as there is no strain upon the leg 19 in raised position whereas the leg 19 assumes the load incident to propping the bicycle when in its operative position. However, both grooves are just deep enough in relation to the pressure exerted by spring 23 so that the leg 19 provides a reliable support in the operative position, while, on the other hand, they are shallow enough in relation to the spring pressure of spring 23 and the leverage afforded by leg 19 in turning the same from one extreme position to the other so that it can be moved one way or the other with reasonably light foot or hand pressure. The journal 20 and bearing 21 as thus far described are the same as in the copending application of Lyle C. Atwood and Howard W. Clay, Serial No. 54,744, filed October 15, 1948, now Patent No. 2,615,729.

In accordance with our parent application, the leg 19 is provided with a positive stop to limit its pivotal movement relative to bearing 21 so that when the leg 19 is extended downwardly to prop a bicycle there will be no danger of the bicycle being allowed to fall over because the leg, when overloaded, collapsed. A stop pin 28 is inserted in a radial hole 29 provided in the journal 20 and projects into an elongated arcuate slot 30 provided in the wall of bearing 21. The slot 30 extends through approximately 120°, corresponding to the 120° spacing of grooves 25 and 26. The pin 28 is so spaced circumferentially relative to grooves 25 and 26, and the slot 30 is so spaced circumferentially relative to slot 27, that when detent pin 24 is engaged in groove 25, the stop pin 28 is disposed at one end of slot 30, as shown in Fig. 1, and, when detent pin 24 is engaged in groove 26, stop pin 28 is disposed at the other end of slot 30. Consequently, leg 19 cannot collapse and let the bicycle fall over, regardless of an overload. Then too, one cannot force the leg 19 upwardly past its normal retracted position. The pin 28, being disposed in a plane intermediate the ends of the journal 20 and C-spring 23, need have only a close or working fit in the hole 29, as distinguished from a drive or press fit, because spring 23 will prevent the pin 28 from becoming displaced from the hole. The construction is also of advantage from the standpoint that the slot 30 is protected by spring 23 against entry of dirt, and the spring gives the device a nicer external appearance, because all of the unsightly parts are enclosed.

It is believed the foregoing description conveys a good understanding of the objects and advantages of our invention. The appended claims have been drawn to cover all legitimate modifications and adaptations.

We claim:

1. In combination, a cycle frame member formed to provide a downwardly opening channel defined by a top wall and spaced side walls extending downwardly therefrom and having bottom edges in a common substantially horizontal plane, a mounting bracket for a cycle attachment, such as a kick stand, comprising a horizontally disposed attaching plate of generally rectangular form abutting said bottom edges and having a central portion offset upwardly from the plane of the plate and profiled to fit non-rotatively between said side walls, said plate having one longitudinal edge portion bent to upwardly opening channel-shaped cross-section receiving in the trough thereof the edge portion of one of said side walls to further hold said plate positively against rotation from a predetermined assembled position on the frame and so that a single bolt will suffice to secure the plate, and a bolt fastening said plate to said frame member entered in a hole provided in the top wall of said frame member and in a registering hole provided in said plate substantially centrally of said upwardly offset central portion.

2. In combination, a cycle frame member formed to provide a channel defined by a substantially horizontal wall and spaced side walls extending in diverging relation to one another and having longitudinal edges in a common horizontal plane, a mounting bracket for a cycle attachment, such as a kick stand, comprising a horizontally disposed attaching plate abutting said longitudinal edges and having a central portion offset from the plane of the plate into the trough of the channel of said frame member and profiled to fit non-rotatively between said diverging side walls, said plate having one longitudinal edge portion bent to channel shaped cross-section receiving in the trough thereof a longitudinal edge portion of one of said side walls of said frame member to further hold said plate positively against rotation from a predetermined assembled position on said frame member independently of the fastening bolt, and a bolt fastening said plate to said frame member entered through a hole provided in the horizontal wall of said frame member and in a registering hole provided in the offset central portion of said plate.

3. As an article of manufacture, a cycle kick stand bracket for use on a cycle frame in front of the rear fork, said frame having laterally spaced substantially vertical walls, said bracket comprising a substantially horizontal sheet metal attaching plate having a central portion of a substantial width struck upwardly from the horizontal plane of the plate to fit non-rotatively between the said spaced walls and having only one longitudinal edge portion alongside said upwardly struck central portion bent to a channel-shaped cross-section to receive in the trough thereof the edge portion of one of said walls to hold the plate in rigid non-rotatable relationship to said wall when secured to said frame, the other longitudinal edge portion of said plate being flat and in the same horizontal plane with the bottom of the aforesaid channel and adapted to have abutment with the edge portion of the other of said walls, said plate having one end portion bent to form in downwardly projecting relationship to said plate a tubular bearing portion, the axis of which is substantially horizontal but extends at an acute angle to and intersects a line parallel to the longitudinal center-line of said plate.

4. As an article of manufacture, a cycle kick stand bracket for use on a cycle frame in front of the rear fork, said frame having laterally spaced substantially vertical walls, said bracket comprising a substantially horizontal sheet metal attaching plate having a central portion of a substantial width struck upwardly from the horizontal plane of the plate to fit non-rotatively between the said spaced walls and having only one longitudinal edge portion alongside said upwardly struck central portion bent to a channel-shaped cross-section to receive in the trough thereof the edge portion of one of said walls to hold the plate in rigid non-rotatable relationship to said wall when secured to said frame, the other longitudinal edge portion of said plate being flat and in the same horizontal plane with the bottom of the aforesaid channel and adapted to have abutment with the edge portion of the other of said walls, said plate having one end portion bent to form in downwardly projecting relationship to said plate a tubular bearing portion, the axis of which is substantially horizontal but extends at an acute angle to and intersects a line parallel to the longitudinal center-line of said plate, the first-mentioned struck-up portion being of dovetail shape widening toward the tubular bearing portion and the channel-shaped edge portion defining one side of the dovetail.

References Cited in the file of this patent

UNITED STATES PATENTS

| 1,525,936 | Heintz | Feb. 10, 1925 |
| 2,202,426 | Pawsat | June 3, 1948 |
| 2,456,536 | Schwinn | Dec. 14, 1948 |

FOREIGN PATENTS

| 49,673 | Netherlands | Dec. 16, 1940 |